(12) United States Patent
    Huck

(10) Patent No.: US 9,165,174 B2
(45) Date of Patent: Oct. 20, 2015

(54) INDICIA READER

(71) Applicant: Hand Held Products, Inc., Fort Mill, SC (US)

(72) Inventor: Richard Huck, Fort Pierce, FL (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/053,314

(22) Filed: Oct. 14, 2013

(65) Prior Publication Data

US 2015/0102109 A1 Apr. 16, 2015

(51) Int. Cl.
*G06K 9/22* (2006.01)
*G06K 7/10* (2006.01)

(52) U.S. Cl.
CPC ...................................... *G06K 7/109* (2013.01)

(58) Field of Classification Search
CPC ..................................................... G06F 1/1632
USPC ......... 235/472.01–472.03, 462.43, 45, 46, 47
See application file for complete search history.

(56) References Cited

U.S. PATENT DOCUMENTS

| | | | |
|---|---|---|---|
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 7,967,190 B2 | 6/2011 | Hussey |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |

OTHER PUBLICATIONS

U.S. Appl. No. 14/274,858 for Mobile Printer With Optional Battery Accessory, filed May 12, 2014, (Marty et al.), 26 pages.

(Continued)

*Primary Examiner* — Jamara Franklin
(74) *Attorney, Agent, or Firm* — Additon, Higgins & Pendleton, P.A.

(57) ABSTRACT

An illuminating, indicia-reading device includes a hand-held indicia reader and a charging-and-communication base. The charging-and-communication base's communication button places the hand-held indicia reader in presentation mode when the hand-held indicia reader is seated in the charging-and-communication base, thereby facilitating hands-free scanning and providing work lamp functionality via activation of the hand-held indicia reader's light source. When the hand-held indicia reader is not seated, the communication button pages the hand-held-indicia reader.

20 Claims, 3 Drawing Sheets

(56) References Cited

U.S. PATENT DOCUMENTS

| | | | |
|---|---|---|---|
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 2007/0063048 A1 | 3/2007 | Havens et al. |
| 2008/0185432 A1 | 8/2008 | Caballero et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0071093 A1* | 3/2012 | Wright et al. ............... 455/41.2 |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0193407 A1 | 8/2012 | Barten |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0306734 A1 | 11/2013 | Xian et al. |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |

(56) References Cited

U.S. PATENT DOCUMENTS

| | | |
|---|---|---|
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |

OTHER PUBLICATIONS

U.S. Appl. No. 14/264,173 for Autofocus Lens System for Indicia Readers filed Apr. 29, 2014, (Ackley et al.), 39 pages.

U.S. Appl. No. 14/230,322 for Focus Module and Components with Actuator filed Mar. 31, 2014 (Feng et al.); 92 pages.

U.S. Appl. No. 14/222,994 for Method and Apparatus for Reading Optical Indicia Using a Plurality of Data filed Mar. 24, 2014 (Smith et al.); 30 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 29/486,759 for an Imaging Terminal, filed Apr. 2, 2014 (Oberpriller et al.); 8 pages.

U.S. Appl. No. 29/436,337 for an Electronic Device, filed Nov. 5, 2012 (Fitch et al.); 19 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 29/459,681 for an Electronic Device Enclosure, filed Jul. 2, 2013 (Chaney et al.); 14 pages.

U.S. Appl. No. 29/459,785 for a Scanner and Charging Base, filed Jul. 3, 2013 (Fitch et al.); 21 pages.

U.S. Appl. No. 29/459,823 for a Scanner, filed Jul. 3, 2013 (Zhou et al.); 13 pages.

U.S. Appl. No. 29/468,118 for an Electronic Device Case, filed Sep. 26, 2013 (Oberpriller et al.); 44 pages.

U.S. Appl. No. 13/367,978, filed Feb. 7, 2012, (Feng et al.); now abandoned.

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/047,896 for Terminal Having Illumination and Exposure Control filed Oct. 7, 2013 (Jovanovski et al.); 32 pages.

U.S. Appl. No. 14/053,175 for Imaging Apparatus Having Imaging Assembly, filed Oct. 14, 2013 (Barber); 39 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via NFC Technology, filed Nov. 8, 2013 (Smith et al.); 28 pages.

U.S. Appl. No. 14/087,190 for Optimal Range Indicators for Bar Code Validation, filed Nov. 22, 2013 (Hejl); 27 pages.

U.S. Appl. No. 14/345,735 for Optical Indicia Reading Terminal with Combined Illumination filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

(56) References Cited

OTHER PUBLICATIONS

U.S. Appl. No. 14/154,207 for Laser Barcode Scanner, filed Jan. 14, 2014 (Hou et al.); 26 pages.

U.S. Appl. No. 14/154,915 for Laser Scanning Module Employing a Laser Scanning Assembly having Elastomeric Wheel Hinges, filed Jan. 14, 2014 (Havens et al.); 24 pages.

U.S. Appl. No. 14/158,126 for Methods and Apparatus to Change a Feature Set on Data Collection Devices, filed Jan. 17, 2014 (Berthiaume et al.); 53 pages.

U.S. Appl. No. 14/342,551 for Terminal Having Image Data Format Conversion filed Mar. 4, 2014 (Lui et al.); 25 pages.

U.S. Appl. No. 14/342,544 for Imaging Based Barcode Scanner Engine with Multiple Elements Supported on a Common Printed Circuit Board filed Mar. 4, 2014 (Liu et al.); 27 pages.

U.S. Appl. No. 14/257,174 for Reading Apparatus Having Partial Frame Operating Mode filed Apr. 21, 2014, (Barber et al.), 67 pages.

U.S. Appl. No. 14/200,405 for Indicia Reader for Size-Limited Applications filed Mar. 7, 2014 (Feng et al.); 42 pages.

U.S. Appl. No. 14/166,103 for Indicia Reading Terminal Including Optical Filter filed Jan. 28, 2014 (Lu et al.); 29 pages.

Affidavit of Prior Public Disclosure, Richard Huck, 2 pages, Apr. 20, 2015.

* cited by examiner

INDICIA READER

FIELD OF THE INVENTION

The present invention relates generally to the field of indicia-reading devices. More particularly, the present invention relates to indicia readers having a presentation mode.

BACKGROUND

Barcode readers are typically configured to acquire information from barcodes and then decode that information for use in data systems. Barcode systems may embrace various kinds of devices used to read barcodes, including hand-held barcode scanners.

Hand-held barcode readers are widely used, in part due to their portability and ease of use. To scan a barcode, a user can easily position a hand-held barcode reader to bring the barcode into its field of view so that the barcode can be read. The hand-held barcode reader usually has a trigger which, when depressed or otherwise activated, will prompt the hand-held barcode reader to read and decode barcodes within its field of view. Alternatively, many hand-held barcode readers can be configured by the user to enter a presentation mode. In presentation mode, the hand-held barcode scanner continuously attempts to read and decode barcodes within its field of view. Presentation mode may time out after a period of inactivity (e.g., one minute) because it tends to deplete the battery and/or increase wear on the unit. Although hand-held barcode readers having a presentation mode are useful in allowing for continuous reading of barcodes (e.g., multiple barcodes presented in succession), the process for configuring the reader to enter (or exit) presentation mode sometimes impedes usability. In particular, many hand-held barcode readers require a user to scan a specific barcode (e.g., a configuration barcode) to enter presentation mode. When the specific configuration barcode is scanned, the hand-held barcode reader enters presentation mode (e.g., for a predetermined duration of time). This approach requires the user to have ready access to the configuration barcode, which is often not the case, especially given, the portable nature of these barcode readers. Alternatively, an application on the host device may be used to send a control command to the scanner to put it into presentation mode. This method requires complexity within the host device application, and requires the scanner to be in a bi-directional interface mode. This approach is often impractical, and, in many cases, is not a desired methodology due to the complexities of the interface logic and the protocol required for the application, to send the appropriate command at the appropriate time.

Furthermore, the health care field has, in general, embraced the use of hand-held barcode readers. In the hospital setting, in particular, hand-held barcode readers are widely used to keep track of patients, medications, patient charts, etc. Hand-held barcode readers are often located on workstations-on-wheels (WOWs), which are portable work areas that typically include battery power for electronic devices, work surface, medication drawers, file storage pockets, and a monitor, keyboard and mouse. These workstations-on-wheels are similar to small desks that an be wheeled from room to room as a healthcare worker (e.g., a nurse) makes the patient rounds, or that can be positioned in any desired area in a hospital or other setting where a portable workstation is desired.

The twenty-four hour nature of healthcare tends to result in medical professionals being required to work in patient rooms during the night. During these and other times, it is often desirable to maintain room lighting at a low level to avoid disturbing the patient. Unfortunately, the low lighting can make it difficult for the healthcare worker to see well enough to perform important tasks such as reading or notating patient charts. While the addition of a small worklight is generally efficacious, the portable nature of the workstation-on-wheels generally means there is little additional space to support another component such as a light and its power cable.

A need exists, therefore, for a hand-held indicia reading device that a user can more easily configure to read indicia in presentation mode. A need also exists for a hand-held indicia reading device that can serve as a light source for a workstation-on-wheels or other work area.

SUMMARY

Accordingly, in one aspect, the present invention embraces an illuminating, indicia-reading device. The illuminating, indicia-reading device includes a hand-held indicia reader that has (i) an indicia-capturing subsystem for acquiring information about indicia within the indicia-capturing subsystem's field of view, (ii) an indicia-decoding module configured for decoding indicia information acquired by the indicia-capturing subsystem, (iii) a light-source emitting broad-spectrum, visible light, and (iv) a hand-supportable housing physically integrating the indicia-capturing subsystem, the indicia-decoding module, and the broad-spectrum light source. The illuminating, indicia-reading device also includes a charging-and-communication base (CCB) having exactly one communication button for initiating communication with the hand-held indicia reader. The charging and communication base is configured to removably seat the hand-held indicia reader. The charging-and-communication base's communication button is configured to activate the indicia-capturing subsystem, the indicia-decoding module, and the broad-spectrum light source when the hand-held indicia reader is seated in the charging and communication base.

In another aspect, the present invention embraces an illuminating, indicia-reading device. The illuminating, indicia-reading device includes a hand-held indicia reader. The hand-held indicia reader has (i) an indicia-capturing subsystem for acquiring information about indicia within the indicia-capturing subsystem's field of view, (ii) an indicia-decoding module configured for decoding indicia information acquired by the indicia-capturing subsystem, (iii) a page-receiving subsystem configured for indicating the location of the hand-held indicia reader, (iv) a light-source emitting broad-spectrum, visible light, (v) a trigger configured to activate the indicia-capturing subsystem, the indicia-decoding module, and the broad-spectrum light, source, and (vi) a hand-supportable housing physically integrating the indicia-capturing subsystem, the indicia-decoding module, the broad-spectrum light source, and the trigger. The illuminating, indicia-reading device also includes a charging-and-communication base having exactly one communication button for initiating communication with the hand-held indicia reader. The charging-and-communication base (CCB) also has a page-transmitting subsystem configured for activating the hand-held indicia reader's page-receiving subsystem. The charging-and-communication base is configured to removably seat the hand-held indicia reader. When the hand-held indicia reader is unseated from the charging-and-communication base, the trigger is configured to activate the indicia-capturing subsystem, the indicia-decoding module, and the broad-spectrum light source, and the charging-and-communication base's communication button is configured to activate the paging subsystem. When the hand-held indicia reader is seated in the charging and communication base, the charging-and-communication base's communication button is configured to activate the indicia-capturing subsystem, the indicia-decoding module, and the broad-spectrum light source. In both instances, the light source is used for either illuminating the indicia or illuminating objects for human viewing or inspection.

In an exemplary embodiment, the illuminating, indicia-reading device includes a trigger integrated into the hand-held indicia reader's hand-supportable housing. The trigger is configured to activate the indicia-capturing subsystem, the indicia-decoding module, and the broad-spectrum light source when the hand-held indicia reader is unseated from the charging-and-communication base.

In another exemplary embodiment, the charging-and-communication base's communication button is configured to page the hand-held indicia reader when the hand-held indicia reader is unseated from the charging and communication base.

In yet another exemplary embodiment, the hand-held indicia reader is configured to emit a sound when paged by the charging-and-communication base.

In yet another exemplary embodiment, the indicia-capturing subsystem, the indicia-decoding module, and the broad-spectrum light source are configured to deactivate after a defined period of indicia-reading inactivity following activation of the indicia-capturing subsystem, the indicia-decoding module, and the broad-spectrum light source by the communication button.

In yet another exemplary embodiment, the charging and communication base's communication button is configured to activate the indicia-capturing subsystem, the indicia-decoding module, and the broad-spectrum light source for a predetermined time period.

In yet another exemplary embodiment, the hand-held indicia-reader is a hand-held barcode reader.

In yet another exemplary embodiment, the hand-held indicia reader is powered by a battery (e.g., a rechargeable battery).

In yet another exemplary embodiment, the light-source emitting broad-spectrum, visible light, is configured to emit white light.

In yet another exemplary embodiment, the light-source emitting broad-spectrum, visible light, is configured to emit electromagnetic radiation an wavelengths between about 450 nanometers to 600 nanometers.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces an illuminating, indicia-reading device. In particular, the present invention embraces an illuminating, indicia-reading device that includes a hand-held indicia reader and a charging-and-communication base (CCB). The hand-held indicia reader is configured to read and decode indicia. In this regard, the term "indicia" is intended broadly to include any machine-readable indicia, including barcodes, QR codes, matrix codes, 1D barcodes, 2D barcodes, RFID tags, IR tags, near-field-communication (NFC) tags, and characters that are readable via optical character recognition (OCR). Indicia are typically graphical representations of information (e.g., data), such as product numbers, package tracking numbers, patient identification numbers, medication tracking identifiers, personnel identification numbers, etc. The use of indicia readers to input data into a system, rather than manual data entry, results in generally faster and more reliable data entry. The hand-held indicia reader includes a trigger that initiates the reading and decoding of indicia within the hand-held indicia reader's field of view.

The charging-and-communication base is configured to removably seat the hand-held indicia reader and to communicate with the hand-held indicia reader. The charging-and-communication base typically includes exactly one communication button for initiating communication with the hand-held indicia reader. The communication button is configured to page the hand-held indicia reader, thereby providing the user with guidance regarding the physical location of the hand-held indicia reader, when the hand-held indicia reader is unseated from the charging-and-communication base. When the hand-held indicia reader is seated in the charging-and-communication base, the communication button is configured to place the hand-held indicia reader into presentation mode. While in presentation mode the hand-held indicia reader's broad spectrum light source is turned on, thereby providing a source of light for the user (e.g., a worklight at a workstation).

Figure 1:
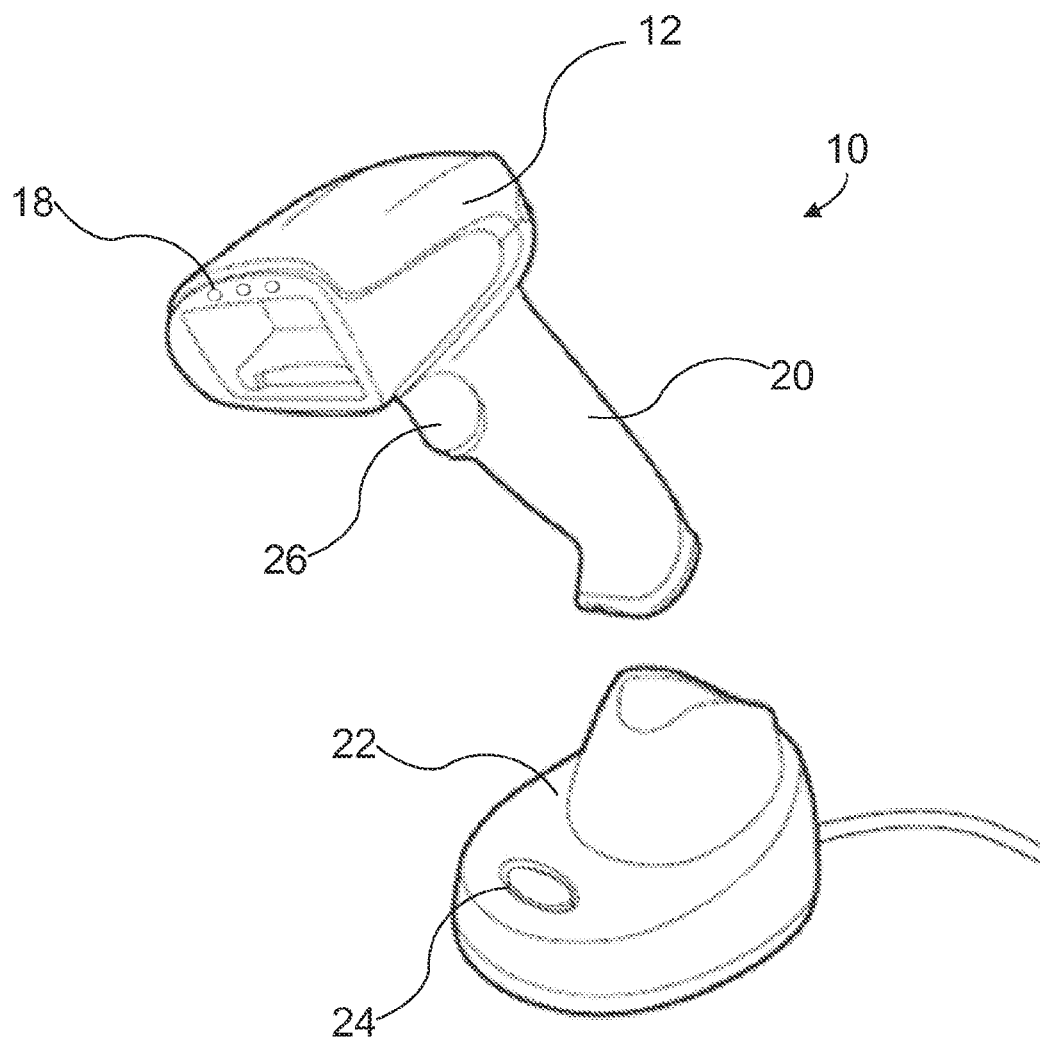
FIG. 1 depicts a perspective view of an exemplary illuminating, indicia-reading device according to the present invention.
Figure 2:
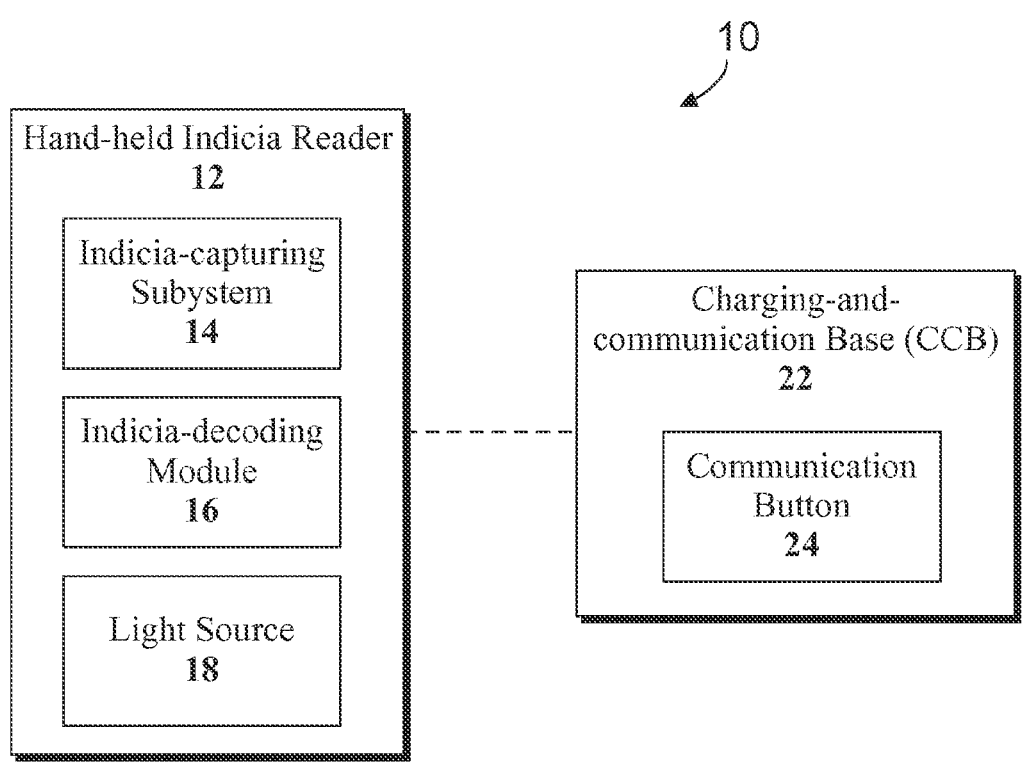
FIG. 2 is a schematic block diagram depicting an exemplary illuminating, indicia-reading device according to the present invention.

Reference is now made to FIGS. 1 and 2. The indicia-reading device 10 according to the present invention includes a hand-held indicia reader 12. The hand-held indicia reader 12 may be any kind of device capable of reading and decoding indicia. Typically, the hand-held indicia reader 12 includes a hand-supportable housing 20 that physically integrates the other components of the hand-held indicia reader 12. The hand-held indicia reader 12 is of a size, weight, and shape that enable a user to hold the hand-held indicia reader in his or her hand(s) while using the hand-held indicia reader 12. Typically, the hand-held indicia reader's hand-supportable housing 20 is ergonomically shaped such that a user can hold and use the hand-held indicia reader 12 comfortably for long periods of time.

The hand-held indicia reader 12 includes an indicia-capturing subsystem 14. The indicia-capturing subsystem 14 acquires information about indicia within the indicia-capturing subsystem's field of view. Typically, the indicia-capturing subsystem 14 is either a laser-scanning module or, more typically in regards to this disclosure, an imaging module (e.g., optical reader). As will be appreciated by one of ordinary skill in the art, a laser-scanning module sweeps a laser from a laser source (e.g., laser diode) across its field of view. A photoreceptor (e.g., photodiode) acquires the laser light reflected from the indicia. The laser-scanning module converts the acquired, reflected laser light (e.g., optical signal) into an electrical signal that can be processed and decoded using signal processing techniques. An imaging module captures an image (e.g., frame) representing objects, including indicia, within its field of view. The image module's image sensor converts light received through the imaging module's lens assembly into a digital image capable of being processed and decoded using image processing techniques.

Without intending to limit the scope of the claims in any way, this disclosure is especially pertinent to indicia readers that utilize an imaging module. Because the disclosure is not limited to such a configuration, however, references hereinafter to "indicia information" are intended to encompass indicia-related data acquired by the indicia capturing subsystem, including both electrical, signals derived from a laser-scanning module's acquisition of laser light reflected from insignia as well as the indicia-depicting portion of an image acquired by an imaging module.

The hand-held indicia reader 12 also includes an indicia-decoding module 16. The indicia-decoding module 16 is configured for decoding indicia information acquired by the indicia-capturing subsystem 14. The indicia-decoding module 16 typically includes a processor (e.g., a computer processor, such as a microprocessor) for processing indicia information and an associated memory for storing indicia information, and software (e.g., image-processing software) that the processor executes to process the indicia information.

The hand-held indicia reader 12 also includes a light source for emitting electromagnetic radiation. Typically, the light source 18 emits broad-spectrum, visible light (e.g., white light). The light source 18 may emit other kinds of visible light, however (e.g., electromagnetic radiation at wavelengths between about 450 nanometers and 600 nanometers), including colored visible light comprised of single or multiple wavelengths (e.g., green light at about 550 nm). The light source 18 typically emits white light suitable for illuminating objects in and around the field of view of the hand-held indicia reader's indicia-capturing subsystem 14. One of the functions of the light-source 18 is to ensure that indicia are illuminated such that the indicia-capturing subsystem 14 can acquire an adequate amount of indicia information. For example, the light-source 18 aids in ensuring that there is enough light reflected off the insignia to allow the indicia-capturing subsystem 14 to obtain a usable (e.g., decodable) image of the indicia. Other advantages of the visible light produced by the light source 18 will be discussed (below).

Typically, the hand-held indicia reader 12 includes a trigger 15 (e.g., switch) that is configured for activating the indicia-capturing subsystem 14, the indicia-decoding module 16, and the light-source 18 when the hand-held indicia reader 12 is unseated from the charging-and-communication base 22. To acquire indicia information, the user actuates (e.g., depresses) the trigger 15 when indicia are brought within the field of view of the indicia-capturing subsystem 14. Typically, the hand-held indicia reader 12 continuously attempts to read and decode indicia as long as the trigger 15 is actuated. When the trigger 15 is released, however, the hand-held indicia reader typically ceases its attempts to acquire indicia information (e.g., by entering standby mode). Typically, the trigger 15 is integrated into (e.g., disposed on) the hand-held indicia reader's hand-supportable housing 20, which also physically integrates the indicia-capturing subsystem 14, the indicia-decoding module 16, and the light-source 18.

The illuminating, indicia-reading device 10 also includes a charging-and-communication base (CCB) 22, commonly referred to as a charging station, base station, or cradle. The charging-and-communication base 22 is often connectable to a host device (not pictured), such as a computer, cash register, point-of-sale (POS) terminal, transaction terminal, or similar device. The charging-and-communication base 22 communicates with the hand-held indicia reader 12 and the host device. For example, the hand-held indicia reader 12 and the charging-and-communication base 22 may communicate via wireless technology (e.g., wireless LAN or PAN transmissions). The wireless connection, permits data such as indicia information (e.g., captured image data, or decoded meta data) to be transmitted from the hand-held indicia reader 12 to the charging-and-communication base 22. Communication of data between the charging-and-communication base 22 and the host device may be by way of these wireless technologies or by way of wired connection technology (e.g., USB, FireWire (IEEE 1394), RS-232, etc.).

The hand-held indicia reader 12 may be seated in (e.g., removably seated in, removably coupled with, docked with, etc.) the charging-and-communication base 22. Typically, when the hand-held indicia reader 12 is seated in the charging-and-communication base 22, the hand-held indicia reader 12 is in a position were it can still acquire indicia information (e.g., its field of view is not blocked by the charging-and-communication base 22 or a supporting surface). In this way, the charging-and-communication base 22 serves as a stand for positioning the hand-held indicia reader 12 in a suitable position for reading indicia (e.g., in presentation mode), or can be attached to a mounting apparatus that allows optimal light projection to the work surface.

The hand-held indicia reader 12 can be equipped with a battery (e.g., a rechargeable lithium ion battery) to provide power, such as during periods when the hand-held indicia reader 12 is removed from the charging-and-communication base 22. The battery may be recharged by seating the hand-held indicia reader 12 in the charging-and-communication base 22. Power to operate the hand-held indicia reader 12 when seated in the charging-and-communication base 22 can originate from the host device, such as via a wired connection (e.g., USB). As will be appreciated by a person of ordinary skill in the art, electrical terminals and conductive contacts can be used to facilitate communication of an electrical signal between the charging-and-communication base 22 and the hand-held indicia reader 12.

The charging-and-communication base 22 has exactly one communication button 24. The communication button 24 initiates communication with the hand-held indicia reader 12. In other words, when a user wishes to initiate a communication from the charging-and-communication base 22 to the hand-held indicia reader 12, the user actuates (e.g., depresses) the communication button 24. The charging-and-communication base 22 may have other buttons or switches that serve functions other than initiating communication with the hand-held indicia reader 12, but the charging-and-communication base 22 embraced by the present invention has exactly one communication button 24 for initiating communication with the hand-held indicia reader 12.

The nature of the communication transmitted by the charging-and-communication base's exactly one communication button 24 changes depending upon the positioning of the hand-held indicia reader 12. More specifically, when the hand-held indicia reader 12 is seated in the charging-and-communication base 22, the communication button 24 is configured to activate the indicia-capturing subsystem 14, the indicia-decoding module 16, and the light source 18. Typically, when the hand-held indicia reader 12 is seated in the charging-and-communication base 22, the communication button 24 is configured to place the hand-held indicia reader 12 into presentation mode, thereby resulting in the continuous activation of the indicia-capturing subsystem 14, the indicia-decoding module 16, and the light source 18. When in presentation mode, the hand-held indicia reader 12 continuously attempts to read and decode indicia until a predetermined period of time elapses after the last successful decoding of an insignia. Alternatively, the hand-held indicia reader remains in presentation mode for a set duration (e.g., between about 5 minutes and 30 minutes).

Placing the hand-held indicia reader 12 into presentation mode by depressing (or otherwise actuating) the communication button 24 while the hand-held indicia reader 12 is seated in the charging-and-communication base 22 provides the user a hands-free indicia-reading experience. The user can place items within the field of view of the hand-held indicia reader 12, which will automatically read the indicia while in presentation mode. An additional benefit of this feature is that it allows the illuminating, indicia-reading device 10 to serve as a worklamp. Because the communication button 24 also activates the light source 18 when the hand-held indicia reader 12 is seated in the charging-and-communication base 22, the user can position the illuminating, indicia-reading device 10 such that, the light source can project light onto the user's work area (e.g., the WOW's work surface). In this regard, the hand-held indicia reader 12 and charging-and-communication base 22 may be physically configured such that when the hand-held indicia reader 12 is seated in the charging-and-communication base 22 the light source projects light downward onto a work surface (e.g., below horizontal at an angle of between about 30 degrees and 90 degrees, such as between about 45 degrees and 60 degrees) rather than horizontally. Additionally, the hand-held indicia reader 12 and charging-and-communication base 22 may be physically configured such that when the hand-held indicia reader 12 is seated in the charging-and-communication base 22 the light source projects light through an opening in the charging-and-communication base 22.

When the hand-held indicia reader 12 is unseated from the charging-and-communication base 22, the communication button 24 pages the hand-held indicia reader 12. In other words, when the hand-held indicia reader 12 is not docked with the charging-and-communication base 22, depressing the communication button 24 results in a signal being sent from the charging-and-communication base 22 to the hand-held indicia reader 12 that results in the hand-held indicia reader 12 making an audible sound (e.g., a series of beeps) and/or displaying a visual cue (e.g., flashing light) to assist the user in locating the hand-held indicia reader 12.

Figure 3:
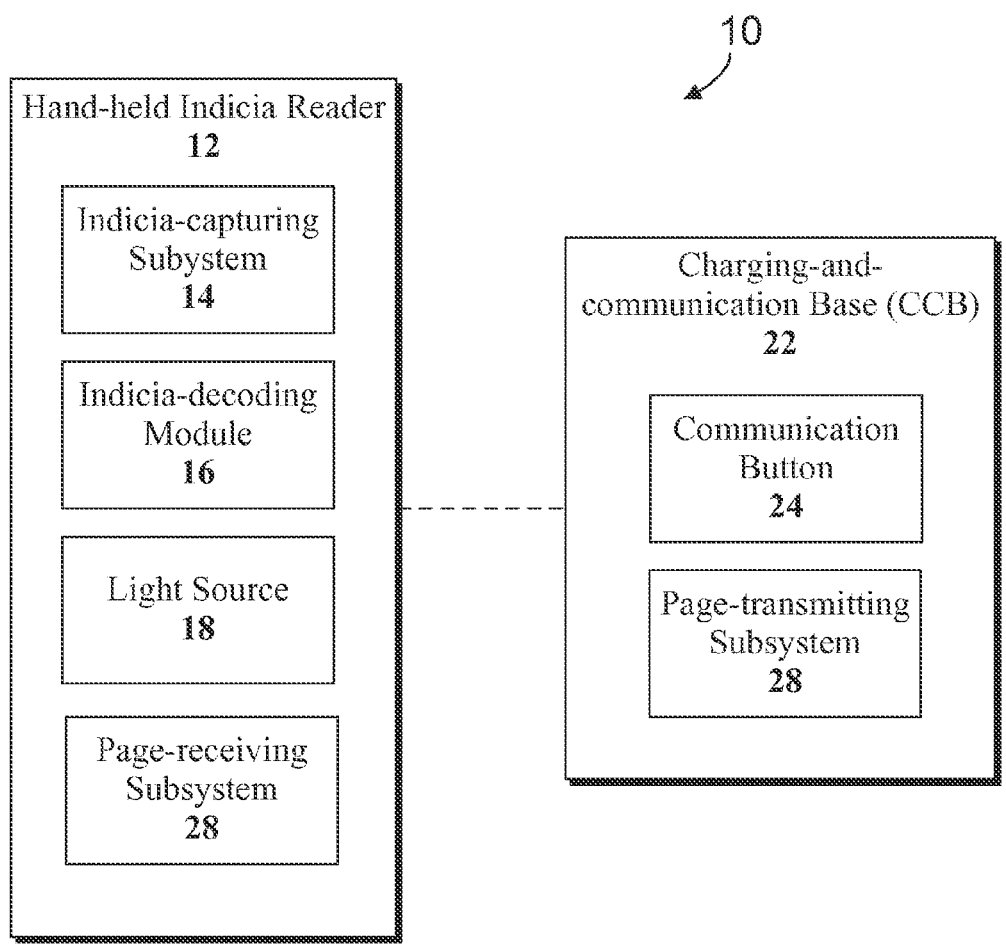
FIG. 3 is a schematic block diagram depicting an alternative exemplary embodiment, of the illuminating, indicia-reading device according to the present invention.

As shown in FIG. 3, in an exemplary embodiment, the indicia-reading device's charging-and-communication base 22 has a page-transmitting subsystem 28. The page-transmitting subsystem 28 is typically a wireless communicator for transmitting wireless communication signals (e.g., wireless PAN or LAN signals, RF signals, IR signals, near-field-communication signals, etc.). Similarly, the hand-held indicia reader 12 has a page-receiving subsystem, which typically includes a wireless receiver for receiving wireless communication signals. The page-transmitting subsystem 28 is configured for activating the hand-held indicia reader's page-receiving subsystem 30 when the communication button 24 is actuated while the hand-held indicia reader 12 is unseated from the charging-and-communication base 22.

To supplement the present disclosure, this application incorporates entirely by reference the following patents, patent application publications, and patent applications: U.S. Pat. No. 6,832,725; U.S. Pat. No. 7,159,783; U.S. Pat. No. 7,128,266; U.S. Pat. No. 7,413,127; U.S. Pat. No. 7,726,575; U.S. Pat. No. 8,390,909; U.S. Pat. No. 8,294,969; U.S. Pat. No. 8,408,469; U.S. Pat. No. 8,408,468; U.S. Pat. No. 8,381, 979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Pat. No. 8,457,013; U.S. Pat. No. 8,448,863; U.S. Pat. No. 8,459,557; U.S. Pat. No. 8,469,272; U.S. Pat. No. 8,474, 712; U.S. Pat. No. 8,479,992; U.S. Pat. No. 8,490,877; U.S. Pat. No. 8,517,271; U.S. Pat. No. 8,556,176 U.S. Pat. No. 8,561,905; U.S. Pat. No. 8,523,076; U.S. Pat. No. 8,528,819; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. Patent Application Publication No. 2013/0175343; U.S. patent application Ser. No. 13/347,193 for a Hybrid-Type Bioptical Laser Scanning And Digital Imaging System Employing Digital Imager With Field Of View Overlapping Field Of Field Of Laser Scanning Subsystem, filed Jan. 10, 2012 (Kearney et al.); U.S. patent application Ser. No. 13/367,047 for Laser Scanning Modules Embodying Silicone Scan Element With Torsional Hinges, filed Feb. 6, 2012 (Feng et al.); U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz); U.S. patent application Ser. No. 13/432,197 for a Laser Scanning System Using Laser Beam Sources For Producing Long And Short Wavelengths In Combination With Beam-Waist Extending Optics To Extend The Depth Of Field Thereof While Resolving High Resolution Bar Code Symbols Having Minimum Code Element Widths, filed Mar. 28, 2012 (Havens et al.); U.S. patent application Ser. No. 13/492,883 for a Laser Scanning Module With Rotatably Adjustable Laser Scanning Assembly, filed Jun. 10, 2012 (Hennick et al.); U.S. patent application Ser. No. 13/367,978 for a Laser Scanning Module Employing An Elastomeric U-Hinge Based Laser Scanning Assembly, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780, 356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736, 139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); U.S. patent application Ser. No. 13/902,110 for a System and Method for Display of Information Using a Vehicle-Mount Computer, filed May 24, 2013 (Hollifield); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); U.S. patent application Ser. No. 13/930,913 for a Mobile Device Having an Improved User Interface for Reading Code Symbols, filed Jun. 28, 2013 (Gelay et al.); U.S. patent application Ser. No. 13/933,415 for an Electronic Device Case, filed Jul. 2, 2013 (London et al.); U.S. patent application Ser. No. 13/947,296 for a System and Method for Selectively Reading Code Symbols, filed Jul. 22, 2013 (Rueblinger et al.); U.S. patent application Ser. No. 13/950,544 for a Code Symbol Reading System Having Adjustable Object Detection, filed Jul. 25, 2013 (Jiang); U.S. patent application Ser. No. 13/961,408 for a Method for Manufacturing Laser Scanners, filed Aug. 7, 2013 (Saber et al.); U.S. patent application Ser. No. 13/973,315 for a Symbol Reading System Having Predictive Diagnostics, filed Aug. 22, 2013 (Nahill et al.); U.S. patent application Ser. No. 13/973,354 for a Pairing Method for Wireless Scanner via RFID, filed Aug. 22, 2013 (Wu et al.); U.S. patent application Ser. No. 13/974,374 for Authenticating Parcel Consignees with Indicia Decoding Devices, filed Aug. 23, 2013 (Ye et al.); U.S. patent application Ser. No. 14/018,729 for a Method for Operating a Laser Scanner, filed Sep. 5, 2013 (Feng et al.); U.S. patent application Ser. No. 14/019,616 for a Device Having Light Source to Reduce Surface Pathogens, filed Sep. 6, 2013 (Todeschini); U.S. patent application Ser. No. 14/023,762 for a Handheld Indicia Reader Having Locking Endcap, filed Sep. 11, 2013 (Gannon); and U.S. patent application Ser. No. 14/035,474 for Augmented-Reality Signature Capture, filed Sep. 24, 2013 (Todeschini).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An illuminating, indicia-reading device, comprising:
   a hand-held indicia reader, comprising (i) an indicia-capturing subsystem for acquiring information about indicia within the indicia-capturing subsystem's field of view, (ii) an indicia-decoding module configured for decoding indicia information acquired by the indicia-capturing subsystem, (iii) a light-source emitting broad-spectrum, visible light, and (iv) a hand-supportable housing physically integrating the indicia-capturing subsystem, the indicia-decoding module, and the broad-spectrum light source; and
   a charging-and-communication base (CCB) having exactly one communication button for initiating communication with the hand-held indicia reader, the charging and communication base configured to removably seat the hand-held indicia reader;
   wherein the charging-and-communication base's communication button is configured to activate the indicia-capturing subsystem, the indicia-decoding module, and the broad-spectrum light source when the hand-held indicia reader is seated in the charging and communication base.

2. The illuminating, indicia-reading device according to claim 1, comprising a trigger integrated into the hand-held indicia reader's hand-supportable housing, the trigger configured to activate the indicia-capturing subsystem, the indicia-decoding module, and the broad-spectrum light source when the hand-held indicia reader is unseated from the charging-and-communication base.

3. The illuminating, indicia-reading device according to claim 1, wherein the charging-and-communication base's communication button is configured to page the hand-held indicia reader when the hand-held indicia reader is unseated from the charging and communication base.

4. The illuminating, indicia-reading device according to claim 3, wherein the hand-held indicia reader is configured to emit a sound when paged by the charging-and-communication base.

5. The illuminating, indicia-reading device according to claim 1, wherein the indicia-capturing subsystem, the indicia-decoding module, and the broad-spectrum light source are configured to deactivate after a defined period of indicia-reading inactivity following activation of the indicia-capturing subsystem, the indicia-decoding module, and the broad-spectrum light source by the communication button.

6. The illuminating, indicia-reading device according to claim 1, wherein the charging and communication base's communication button is configured to activate the indicia-capturing subsystem, the indicia-decoding module, and the broad-spectrum light source for a predetermined period of time.

7. The illuminating, indicia-reading device according to claim 1, wherein the hand-held indicia-reader is a hand-held barcode reader.

8. The illuminating, indicia-reading device according to claim 1, wherein the hand-held indicia reader is powered by a battery.

9. The illuminating, indicia-reading device according to claim 8, wherein the battery is a rechargeable battery.

10. The illuminating, indicia-reading device according to claim 1, wherein the light source emitting broad-spectrum, visible light is configured to emit white light.

11. The illuminating, indicia-reading device according to claim 1, wherein the light source emitting broad-spectrum, visible light is configured to emit electromagnetic radiation at wavelengths between about 450 nanometers and 600 nanometers.

12. An illuminating, indicia-reading device, comprising:
a hand-held indicia reader, comprising (i) an indicia-capturing subsystem for acquiring information about indicia within the indicia-capturing subsystem's field of view, (ii) an indicia-decoding module configured for decoding indicia information acquired by the indicia-capturing subsystem, (iii) a page-receiving subsystem configured for indicating the location of the hand-held indicia reader, (iv) a light-source emitting broad-spectrum, visible light, (v) a trigger configured to activate the indicia-capturing subsystem, the indicia-decoding module, and the broad-spectrum light source, and (vi) a hand-supportable housing physically integrating the indicia-capturing subsystem, the indicia-decoding module, the broad-spectrum light source, and the trigger; and
a charging-and-communication base (CCB) having exactly one communication button for initiating communication with the hand-held indicia reader and comprising a page-transmitting subsystem configured for activating the hand-held indicia reader's page-receiving subsystem, the charging-and-communication base configured to removably seat the hand-held indicia reader;
wherein, when the hand-held indicia reader is unseated from the charging-and-communication base, the trigger is configured to activate the indicia-capturing subsystem, the indicia-decoding module, and the broad-spectrum light source, and the charging-and-communication base's communication button is configured to activate the paging subsystem; and
wherein, when the hand-held indicia reader is seated in the charging and communication base, the charging-and-communication base's communication button is configured to activate the indicia-capturing subsystem, the indicia-decoding module, and the broad-spectrum light source.

13. The illuminating, indicia-reading device according to claim 12, wherein the hand-held indicia-reader is a hand-held barcode reader.

14. The illuminating, indicia-reading device according to claim 12, wherein the hand-held indicia reader is powered by a battery.

15. The illuminating, indicia-reading device according to claim 14, wherein the battery is a rechargeable battery.

16. The illuminating, indicia-reading device according to claim 12, wherein the light source emitting broad-spectrum, visible light is configured to emit white light.

17. The illuminating, indicia-reading device according to claim 12, wherein the light source emitting broad-spectrum, visible light is configured to emit electromagnetic radiation at wavelengths between about 450 nanometers and 600 nanometers.

18. The illuminating, indicia-reading device according to claim 12, wherein the hand-held indicia reader is configured to emit a sound when paged by the charging-and-communication base.

19. The illuminating, indicia-reading device according to claim 12, wherein the hand-held indicia reader is configured to display a visual cue when paged by the charging-and-communication base.

20. The illuminating, indicia-reading device according to claim 12, wherein the hand-held indicia reader is configured to emit a sound and display a visual cue when paged by the charging-and-communication base.

* * * * *